(12) United States Patent
Ramslie et al.

(10) Patent No.: US 11,313,098 B2
(45) Date of Patent: Apr. 26, 2022

(54) GRAVITY-BASED STRUCTURE

(71) Applicant: Seatower AS, Oslo (NO)

(72) Inventors: Sigurd Ramslie, Quinns Rocks (AU); Petter J. Karal, Oslo (NO)

(73) Assignee: Seatower AS, Oslo (NO)

( * ) Notice: Subject to any disclaimer, the term of this patent is extended or adjusted under 35 U.S.C. 154(b) by 0 days.

(21) Appl. No.: 14/403,909

(22) PCT Filed: May 6, 2014

(86) PCT No.: PCT/EP2014/059210
§ 371 (c)(1),
(2) Date: Nov. 25, 2014

(87) PCT Pub. No.: WO2014/180828
PCT Pub. Date: Nov. 13, 2014

(65) Prior Publication Data
US 2015/0136670 A1 May 21, 2015

(30) Foreign Application Priority Data

May 6, 2013 (NO) .................................... 20130641

(51) Int. Cl.
*E02D 19/22* (2006.01)
*E02D 27/42* (2006.01)
(Continued)

(52) U.S. Cl.
CPC .............. *E02D 19/22* (2013.01); *E02B 17/02* (2013.01); *E02D 3/00* (2013.01); *E02D 27/10* (2013.01);
(Continued)

(58) Field of Classification Search
CPC ........... E02D 19/22; E02D 3/00; E02D 27/10; E02D 27/42; E02D 27/425; E02D 27/50; E02D 27/525; E02B 17/02
(Continued)

(56) References Cited

U.S. PATENT DOCUMENTS 2,895,301 A   7/1959  Casagrande et al.
3,928,982 A * 12/1975  Lacroix ................... E02D 27/52
                                                              405/210

(Continued)

FOREIGN PATENT DOCUMENTS

FR  2664311 A1  1/1992
GB  1472538 A   5/1977
(Continued)

OTHER PUBLICATIONS

Geiger, Harald, "International Search Report," prepared for PCT/EP2014/059210, dated Aug. 19, 2014, three pages.

*Primary Examiner* — Matthew Troutman
*Assistant Examiner* — Patrick F Lambe
(74) *Attorney, Agent, or Firm* — Shackelford, Bowen, McKinley & Norton, LLP

(57) ABSTRACT

A gravity-based structure (1) for supporting offshore installations comprising a foundation (4). The foundation (4) has a basal portion (11). The basal portion (11) has a plurality of openings (10) for drainage of water. There is at least one first layer (7) of filter material, with a gradation suitable for draining water entrapped beneath the basal portion (11) to the openings (10). The layer (7) is installed on the seabed (8) beneath the foundation (4). The foundation has a downwardly extending skirt (5) that is adapted to penetrate into the seabed beneath the filter material layer (7).

20 Claims, 5 Drawing Sheets

(51) Int. Cl.
*E02B 17/02* (2006.01)
*E02D 3/00* (2006.01)
*E02D 27/10* (2006.01)
*E02D 27/50* (2006.01)
*E02D 27/52* (2006.01)

(52) U.S. Cl.
CPC ........... *E02D 27/42* (2013.01); *E02D 27/425* (2013.01); *E02D 27/50* (2013.01); *E02D 27/525* (2013.01)

(58) Field of Classification Search
USPC .............. 405/195.1, 203, 205, 224, 225
See application file for complete search history.

(56) References Cited

U.S. PATENT DOCUMENTS

| | | | |
|---|---|---|---|
| 4,036,161 A * | 7/1977 | Nixon | B63B 21/26 114/296 |
| 4,103,502 A * | 8/1978 | Cashman | E02B 17/02 405/117 |
| 4,371,292 A | 2/1983 | Takahashi et al. | |
| 4,693,637 A * | 9/1987 | Suzuki | E02B 17/025 114/296 |
| 4,761,096 A * | 8/1988 | Lin | E02B 17/00 405/224.1 |
| 2011/0158751 A1 | 6/2011 | Ohkubo et al. | |
| 2011/0158753 A1* | 6/2011 | Ohkubo | E02D 15/10 405/302.6 |
| 2011/0305523 A1 | 12/2011 | Karal et al. | |
| 2012/0230773 A1 | 9/2012 | Foo et al. | |

FOREIGN PATENT DOCUMENTS

| WO | WO-2005038146 A1 | 4/2005 |
|---|---|---|
| WO | WO-2009154472 A2 | 12/2009 |
| WO | WO-2010143966 A2 | 12/2010 |

* cited by examiner

GRAVITY-BASED STRUCTURE

FIELD OF THE INVENTION

The present invention in general, relates to a gravity-based structure for supporting off-shore installations.

Particularly, the present invention relates to a technology for supporting gravity-based structures in a technically efficient manner. Especially, the present invention is directed towards reducing the problems associated with pore pressure effect due to weak soil and pumping effect due to water pockets beneath the structure.

More particularly, the present invention relates to a gravity-based structure according to the preamble of claim 1.

TECHNICAL BACKGROUND OF THE INVENTION

It is known that offshore installations such as wind turbines and the like often are supported on structures that derive stability from their own weight on the seabed, commonly known in the field as gravity based structures (GBS). Use of gravity based structures for supporting various types of offshore installations, is thus well known.

Though gravity based structures, when deployed on the seabed, derive their stability mainly from their own weight, stability of such structures is a very common concern in this field of technology, particularly due to pore pressure effect and pumping effect on the seabed, on which such structures stand.

The capacity of certain types of seabed, particularly sands, silts and clays, to carry loads is frequently weakened by increased pore water pressure as result of cyclic loads. Sea water beneath the foundation gets trapped and with cyclic loads, typically from waves, currents and wind, a pressure build-up—generally called 'pore pressure build-up'—occurs in the soil below the structure. Excess pore pressure may cause part of the foundation weight to be supported by a water cushion, and hence the weight becomes ineffective with regards to resisting loads.

Pockets of water left under the foundation worsen the effect of pore pressure build-up as they generate a "pumping" effect, when the foundation is subjected to cyclical loading, e.g. from waves, currents or wind.

To overcome the problems as stated above, it is known to dredge the seabed by special vessels to remove layers that are prone to pore pressure build-up. However, dredging operations are costly and disturb the marine environment. Often, a relatively large volume needs to be dredged, and depositing the excavated materials back on the seabed, further disturbs the marine habitat.

Another technique is to place a gravel layer on the seabed and then placing the foundation upon the gravel layer. Such a gravel layer is laid within very strict tolerances, in order to obtain the desired effect of avoiding water pockets under the foundation base. This method is commonly used in combination with dredging. However, differential settlements under the base, as a result of seabed sediments filling up voids between the stones in the gravel layer, can potentially to lead to a gradual loss of load bearing capacity, unwanted loads on the base plate and to a tilt of the foundation. In this technique the foundation has a generally even underside or an underside with small ribs or similar. This provides a limited ability to resist against sliding of the foundation when subjected to great side forces due to currents, waves and wind.

US patent application publication US2011/0305523, belonging to the present applicant, discloses a foundation having a bottom slab and a wall extending upwards from the bottom slab and also circumferential skirt extending downwards from the bottom slab, to define at least one compartment beneath the slab. It also discloses radial skirts dividing the confined space within the circular skirt into a number of compartments.

The skirts improve the load bearing capacity of the foundation by transferring the loads into deeper soil strata and the circular skirt reduces deteriorating effects from possible scour of the seabed along the periphery.

This patent publication also teaches applying grout into the compartments in order to avoid water filled pockets to be trapped between the bottom of the foundation and the seabed. The skirt will isolate the soil beneath the foundation and encapsulate any water pockets within the soil.

The design disclosed in the above patent application is costly due to the use of grout. Further, injection of grout further blocks drainage of water from the soils in the seabed below the foundation, increasing potential pore pressure build-up.

A reduction of pore pressure and hence a strengthening effect can also be obtained at sea by providing drain pipes providing flow channels to vent excess water pressure out of the soil beneath the foundation. This method is known from, e.g., FR 2664311, U.S. Pat. No. 4,693,637, GB 1472538 and U.S. Pat. No. 2,895,301, but the strengthening effect decreases very rapidly with distance from the vent points. The beneficial effect of the drainage is therefore limited, unless the number of drainage points is very large and therefore costly. Furthermore, the drainage channels must be kept open (not clogged by seabed sediments) in order to continuously provide drainage to from the soil.

Extending a large number of pipes into the seabed also generates large penetration resistance that must be overcome during foundation installation. This can limit the achievable length of skirts and hence the ability to reach better soil at larger depth.

Increasing the dimensions of the structure or increase of ballasts weight to compensate for lost load bearing capacity due to pore pressure build-up up increases fabrication costs, load out and installation costs, and also tends to attract larger wave loads. It can also further increase the pore pressure build-up, thereby reducing improvement in load bearing capacity.

Hence, there is a need for a gravity based structure which substantially reduces the problems associated with pore pressure build-up and pumping effect due to water pockets beneath the structure.

Furthermore, gravity based foundations are typically provided with erosion protection commonly called scour protection. The intention is to avoid erosion due to water movements around the foundation as such erosions may undermine the foundation and lead to its de-stabilization.

The most common system for scour protection is a layer of small rocks placed around the foundation, called "filter layer". Typically the filter layer needs to be kept in place by heavy objects, for instance large rocks, called "armour layer".

The current state of the art is to install either the armour layer or both layers after the installation of the foundation. This makes the foundation prone to erosion, during the period from installation of the foundation and to the placement of scour protection around it. Furthermore, the scour protection known in the art until now is not known to contribute to reducing pore pressure build-up in the seabed under the protected structure.

Hence, there is also a need for a gravity based structure which overcomes the drawback stated in the preceding paragraph and also the other drawbacks as elaborately discussed hereinbefore.

The present invention meets the above mentioned needs and other associated needs by providing a skirted gravity based structure placed on a gravel layer that acts as a drainage layer under the foundation and as a scour protection filter layer surrounding the foundation. In a preferred embodiment the gravel layer is pre-located on the seabed prior to the installation of the foundation. The pore openings between the rocks in the gravel layer act as a multitude of ventilation channels. This allows pore pressure to be effectively drained out through the gravel layer and through openings in the basal part of the foundation to the ambient water surrounding the structure. It furthermore reduces the negative effects of water pockets under the foundation, by removing or at least substantially reducing the pumping effect.

The gradation of the gravel layer is selected, such that the gravel layer(s) also enhance drainage of water through it, and at the same time so that they prevent seabed sediments from filling up voids between the stones in the gravel layer, which would block the drainage effect.

OBJECTS OF THE INVENTION

It is the principal object of the present invention to provide a gravity based structure for supporting offshore installations which can substantially reduce the pore pressure effect and the pumping effect on the seabed and hence achieve significant stability improvements.

It is another object of the present invention to provide a gravity based structure for supporting offshore installations which can allow a substantial amount of water pockets beneath the foundation base on a seabed prone to pore pressure build-up.

It is also another object of the present invention to provide a gravity based structure for supporting offshore installations which provides substantial and instant protection from scouring and erosion that normally occur to structures that are placed directly upon the seabed.

All through the specification including the claims, the words "gravity based structure", "offshore installations", "tower", "foundation", "plate/slab", "scour protection layers", "gravel layer", "pore pressure effect", "pumping effect", "filter layer", "armour layer", "conical" are to be interpreted in the broadest sense of the respective terms and includes all similar items in the field known by other terms, as may be clear to persons skilled in the art.

The gravel or rocks referred to in the description is sometimes called a "filter layer" and sometimes "scour protection". It should be understood that the gravel or rocks primarily serves as a filter layer within the boundaries of the skirt of the foundation and a primarily as scour protection outside the boundaries of the skirt. However, it should be understood that the same layer will serve partly as filter layer and partly as scour protection, as the same layer will be situated partly within the skirt and partly outside the skirt.

Restriction/limitation, if any, referred to in the specification, is solely by way of example and understanding the present invention.

SUMMARY OF THE INVENTION

As stated initially the present invention relates to a gravity based structure for supporting offshore installations comprising a foundation, the foundation having a basal portion. The invention solves the initially discussed problem with the provisions that the basal portion has a plurality of openings for drainage of water, that at least one first layer of filter material, with a gradation suitable for draining water entrapped beneath the basal portion to the openings, is pre-installed on the seabed before the installation of the foundation, and that the foundation has a downwardly extending skirt that is adapted to penetrate the filter material layer.

In one embodiment the layer of material is the only layer of filter material between the basal portion and the natural seabed, the layer having a gradation that is suitable both for effective drainage of water from the seabed and substantially preventing seabed sediments from entering into the pores within the layers. Depending on the soil at the installation site, this single layer may be sufficient.

In a preferred embodiment the openings comprise channels provided in the basal portion of the foundation, the openings extending generally upwards from the bottom surface of the basal portion to its top and/or side surfaces.

In an alternative embodiment openings are also provided in the skirts.

In another embodiment the first filter layer is a rock layer and a second rock filter layer of suitable gradation is provided on top the first filter layer prior to installation of the foundation, that the second layer is of a coarser gradation than the first layer, the first layer has a gradation that substantially prevents seabed sediments from entering the pores between the grains, and that the second layer extends beyond the perimeter of the first layer and also beyond the perimeter of the basal portion when this is installed.

In yet another embodiment an additional scour protective layer with a coarser gradation that the first layer is provided in an annular configuration on top the first or the second layer prior to installation of the foundation to act as an armour layer, and that there is an opening in the middle of the additional scour protective layer for the foundation to be installed.

In still another embodiment it is provided that after installation of the foundation, the gap between the foundation and the annularly disposed scour protection layer is adapted to be filled with additional scour protection material, such as bags containing solid material, such as filter units (mesh bags filled with rocks) or sand bags.

In a further embodiment the openings are provided with filters for preventing unwanted clogging by sediments.

In still a further embodiment the first layer has a gradation of 10-30 mm and that the second layer has a gradation of 25-70 mm.

In an alternative embodiment the bottom surface of the basal portion of the foundation is provided with bags having filter material therein, for installation on the seabed together with the foundation.

In one embodiment the bags are filled with light expanded clay aggregate or similar.

In another embodiment a geo-textile membrane is pre-installed beneath the bottom surface of the basal portion.

In a further embodiment a piping system is located inside the basal portion for injecting grout to expel water pockets beneath the basal portion.

In yet another embodiment landing plates are provided at the bottom surface of the basal portion to create a gap between the top scour protecting layer and the basal portion.

In yet another embodiment, the landing plates are each equipped with a circumferential skirt.

In still another embodiment the bottom surface of the basal portion of the foundation has an uneven geometry or texture to increase friction against the underlying rock layer.

In a further embodiment the uneven bottom surface is created by rocks partially embedded into the concrete of the foundation.

BRIEF DESCRIPTION OF THE DRAWINGS

Having described the main features of the invention above, a more detailed and non-limiting description of a few exemplary embodiments follow, with reference to the drawings.

DETAILED DESCRIPTION OF THE INVENTION

Figure 1:
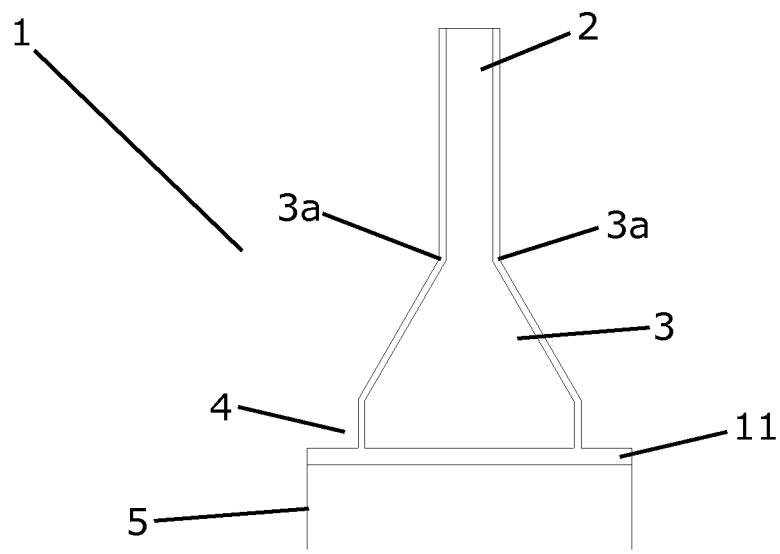
FIG. 1 is a schematic view of a preferred embodiment of the gravity based structure according to the present invention.

The following describes some preferred embodiments of the present invention which are purely exemplary for the sake of understanding the invention and non-limiting.

In all the figures, like reference numerals represent like features. Further, when in the following it is referred to "top", "bottom", "upward", "downward", "above" or "below", and similar terms, this is strictly referring to an orientation with reference to the seabed, where the seabed is considered to be horizontal and at the bottom.

The disposition of offshore units and related units are not shown, as those are not consequential to the present invention and should be understood by persons skilled in the art. Moreover, the topside structure that is to be residing on top of the foundation structure is not shown. This may be a wind turbine, drilling or production platform or other types of facility that may be installed at sea.

FIG. 1 is a schematic view of a gravity based structure 1 according to a preferred embodiment of the present invention. It comprises a foundation portion 4 having a basal portion 11, a tower portion 2 and a conical portion 3. For the sake of understanding, the scouring protection layer 7 (best shown in FIG. 2) is not shown in FIG. 1. The tower portion 2 extends upwards from the neck portions 3a of the conical portion 3. FIG. 1 also shows the generally flat basal plate/slab 11 of the foundation 4. From this basal part 11, skirts 5 extend downwards.

The foundation 4, the conical portion 3 and the tower 1 may all be made of re-enforced concrete and made in one piece. However, the tower 1 may also be made of steel and be bolted or otherwise firmly attached to the lower part of the foundation.

Figure 2:
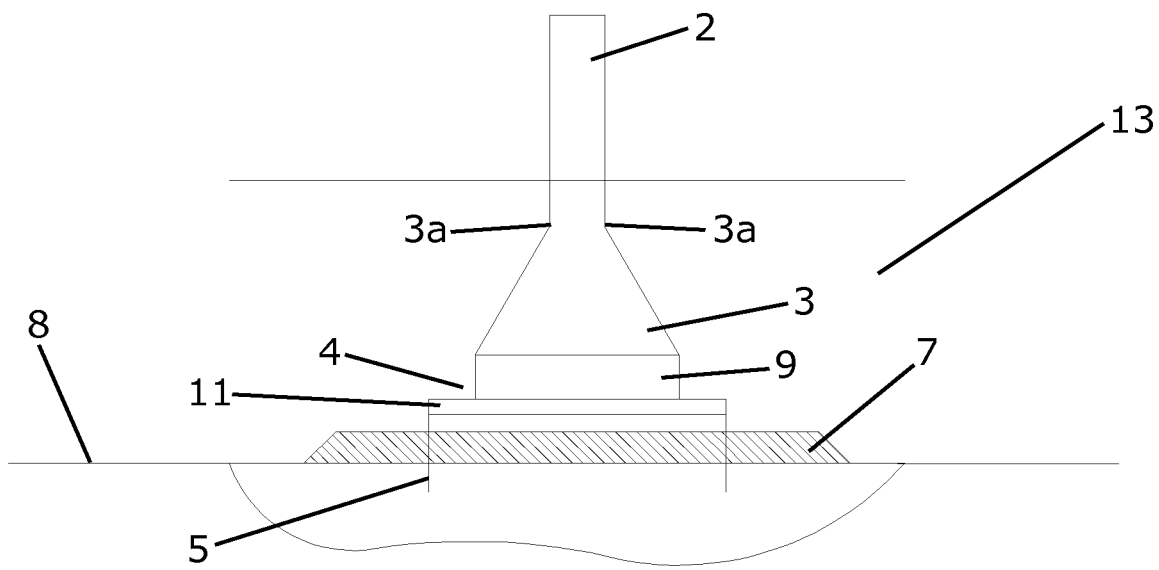
FIG. 2 is a schematic view of the gravity based structure in FIG. 1 under sea water and installed on the seabed.

FIG. 2 is a view of the gravity based structure 1 in FIG. 1 along with the other associated elements. It shows the foundation part 4 on the seabed 8 under the sea water 13. This figure also shows a single gravel layer 7, acting as a filter layer. This forms an integral part of the gravity based structure 1. The foundation 4 has a basal part 11 and a vertical wall 9, extending upwards from the basal part 11. The skirts 5 act as interface to the seabed 8 and penetrate the filter layer 7 and the seabed 8.

FIG. 2 also shows distinctly the single layer of filter gravel layer 7 on which the basal plate/slab 11 of the foundation 4 rests. This layer is installed on the seabed 8 prior to installation of the structure 1. The gradation in this rock layer 7 is selected such that it provides effective drainage between the seabed 8, the basal part 11 and, via openings (described below), the ambient water 13 surrounding the foundation 4. The filter layer 7 at the same time ensures that the seabed sediments cannot to any substantial degree penetrate into the pores in the filter layer 7. These aspects are explained later in detail, while explaining the functioning of the present invention.

Figure 3:
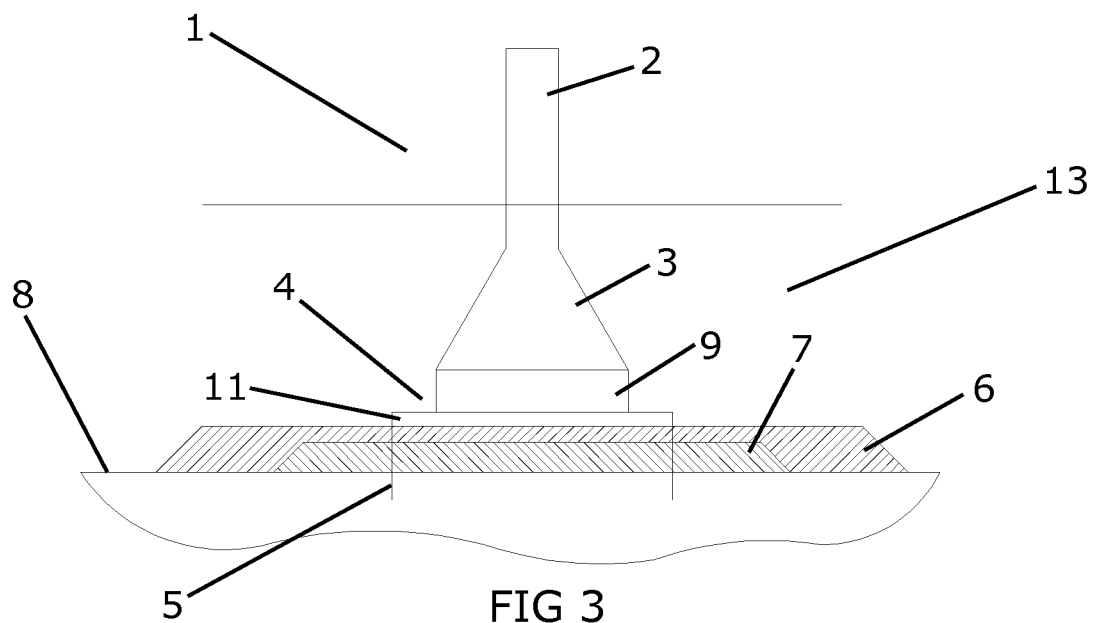
FIG. 3 is a schematic view of another preferred embodiment of the gravity based structure, according to the present invention.

FIG. 3 is a view of another preferred embodiment which is similar to the one in FIG. 2 with the exception that there are two filter layers, a second layer 6 on top of the first layer 7, with the top layer 6 having a coarser grain size than the lower layer 7. These layers are installed on the seabed 8 prior to installation of the structure 1 one after the other. These layers 6, 7 are best shown in FIG. 5.

Figure 4A:
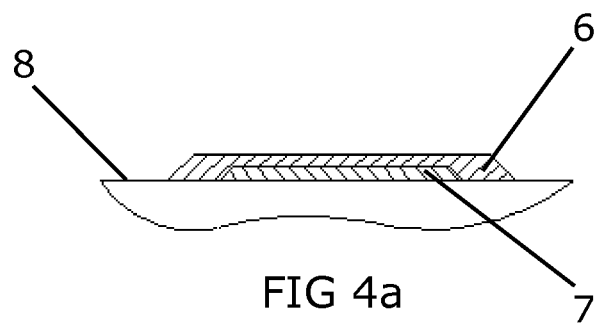
FIG. 4a is a sectional view and 4b is the top view showing two layers of scouring protection provided on the seabed, in accordance with the present invention.
Figure 4B:
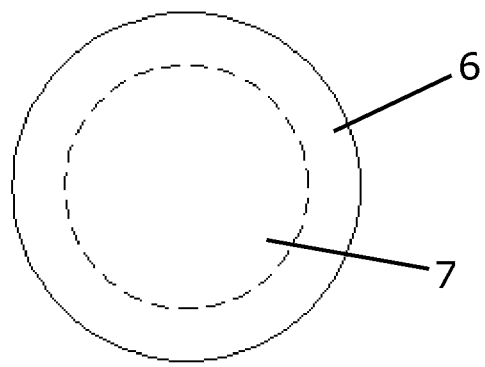

FIGS. 4a and 4b are respectively cross sectional and top views of the scour protection layers on the seabed 8 in FIG. 3. The figures show the scour protection layers only, for the sake of clarity. The configuration of the top layer 6 and the bottom layer 7, the latter resting on the seabed 8, is clear from FIG. 4a, and it can be seen that the top layer 6 extends somewhat beyond the bottom layer 7. FIG. 4b is the top view of the two layers. The dotted lines indicate that seen from above, only the top layer 6 is visible and not the lower layer 7.

Figure 5:
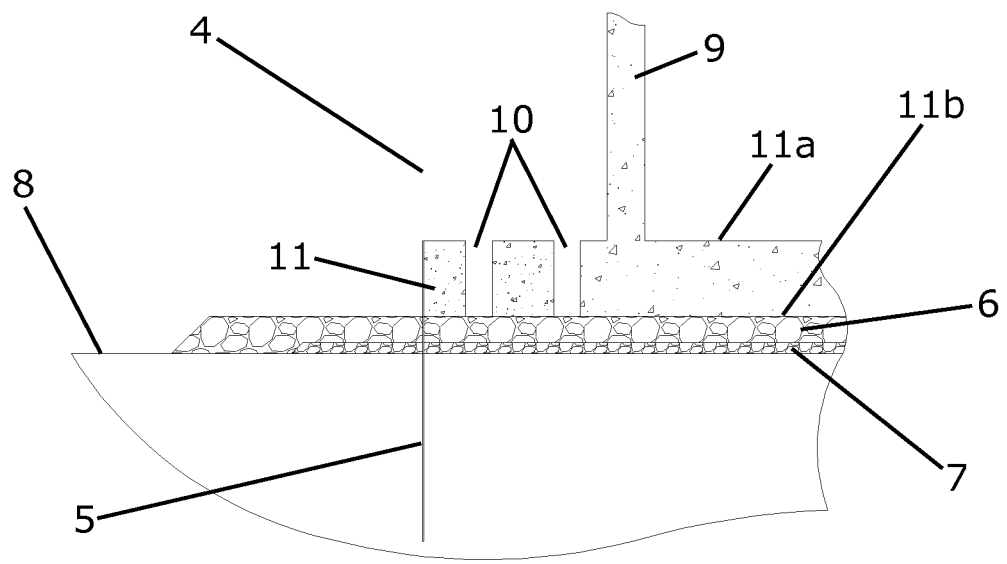
FIG. 5 is a sectional view of a preferred embodiment of only the foundation part of the gravity based structure in FIG. 3.

FIG. 5 is a cross-sectional enlarged view of a part of the foundation 4. The basal plate/slab 11 of the foundation 4 and the vertical wall 9 extending upwards from the basal plate/slab 11 is shown clearly. Also shown is that the basal plate/slab 11 of the foundation 4 has a top surface 11a and a bottom surface 11b. The bottom surface 11b rests on the top coarser layer 6. Vertical openings 10 extend upwards from the bottom surface 11b to the top surface 11a of the basal plate/slab 11.

These vertical openings 10 can have other shapes and configurations than what is shown in this embodiment and this is within the scope of the present invention.

These openings 10 connect the seabed 8 and the scour protecting layers 6, 7 with the ambient sea water 13 surrounding the foundation 4 (best shown in FIG. 3) and hence effectively reduces pore pressure build up by effectively draining out the water.

Figure 6:
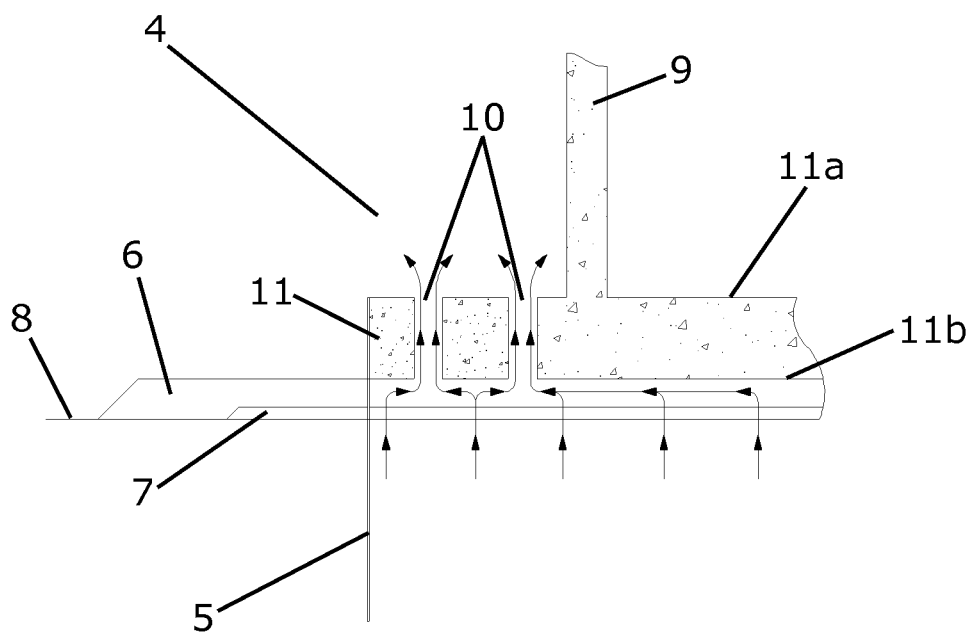
FIG. 6 is a view identical to the view in FIG. 5, showing the flow paths of water being vented out of the foundation.

The flow path of the water from the seabed 8, through the scour protecting layers 6, 7 to the ambient sea water 13 (see also FIG. 3) surrounding the foundation 4 is shown by arrows in FIG. 6. This figure in particular shows how the openings 10 function.

The openings 10 may be present in the skirt 5 as well to perform the same function (not shown) and this is within the scope of the present invention.

Figure 7A:
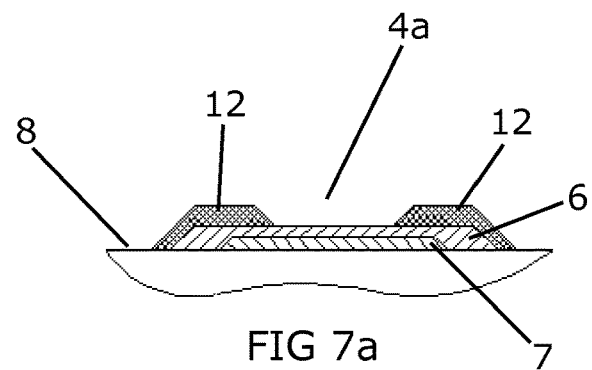
FIG. 7a is a cross-sectional view and FIG. 7b is the top view of the seabed showing three layers of scouring protection, according to another preferred embodiment of the gravity based structure.
Figure 7B:
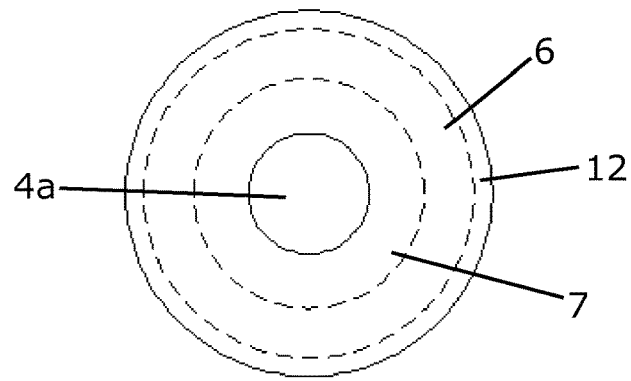

FIGS. 7a and 7b are cross-sectional and top views respectively of only the seabed 8 showing three layers of rock or gravel on according to another preferred embodiment of the gravity based structure. The first layer 7 acts as a filter layer within the basal part 11 of the foundation 4. The second layer 6 acts partly as a filter layer (the portion being situated within the skirt 5) and partly as scour protection (the portion being satiated outside the skirts 5). The third layer 12 is laid in an annular fashion over the second layer 6, which in turn lies on top of the first layer 7, which in turn is in direct contact with the seabed 8. The third layer 12 acts as a scour protection for the foundation 4.

FIG. 7b shows the top view of the scour protection layers 6, 7 & 12. The lower layer 7 is entirely covered by the second layer 6 as is shown with a dotted line. The top layer 12 acts as an armour layer.

As explained later, the third layer 12 provides a central space 4a at the middle allowing room for the foundation 4 to be installed.

Figure 8:
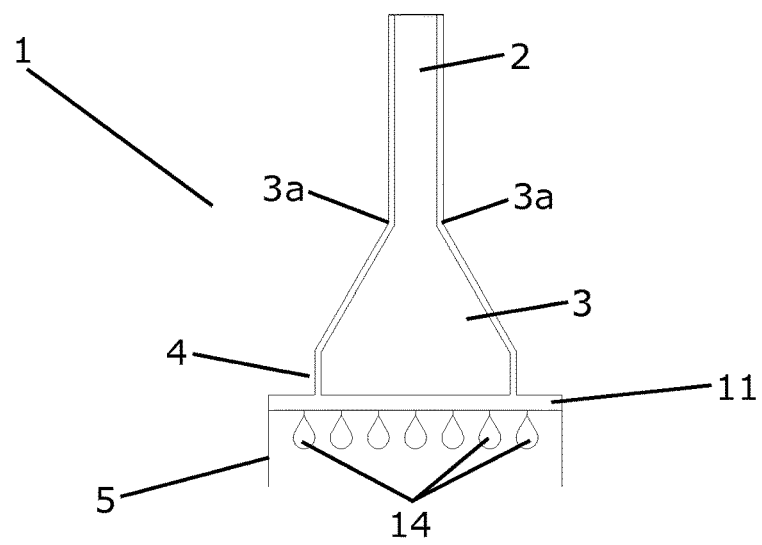
FIG. 8 is a schematic view of a further preferred embodiment of the gravity based structure of the present invention showing bags loaded to the base plate.

FIG. 8 is a view of an alternative embodiment of the structure 1 which has bags 14 comprising rocks attached at the bottom portion 11b of the basal plate 11. This makes it possible to install the single filter layer 7 (or the top coarse layer 7) simultaneously with the foundation.

Figure 9:
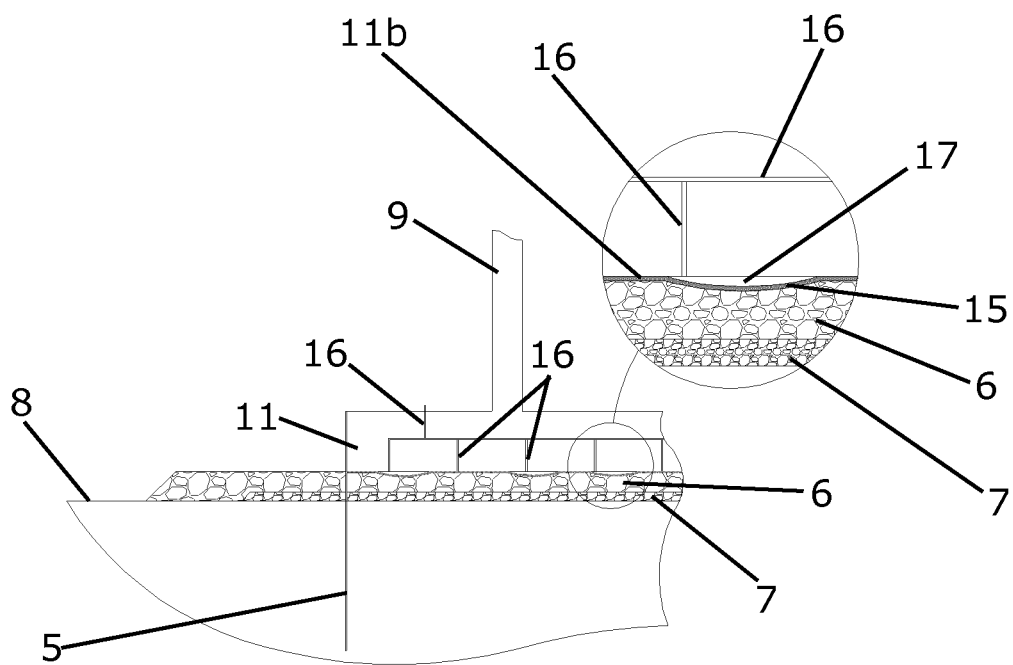
FIG. 9 is a sectional view of another preferred embodiment of only the foundation part of the gravity based structure in FIG. 3, showing use of geo textile membrane.

FIG. 9 is a sectional view of another embodiment of the foundation shown in FIG. 3 with skirts 5 having penetrated through two layers of stones 6, 7 and into the natural seabed 8 below. Water pockets 17 (best shown in the enlarged detailed view in FIG. 9) are left between the bottom plate 11 and the uppermost layer of stones 6.

To expel water from the water pockets 17, a geo-textile membrane 15 (i.e. a permeable fabric that has the ability to separate, filter, reinforce, protect, or drain) is connected to the underside 11b of the base plate 11 and a system of horizontal and vertical pipes 16 is arranged inside the base plate 11 to supply grout to expel the water out of the water pockets 17. The functions of all these features are elaborated later. The pipes 16 can have other configurations than what is shown in this embodiment and this is within the scope of the present invention.

Figure 10:
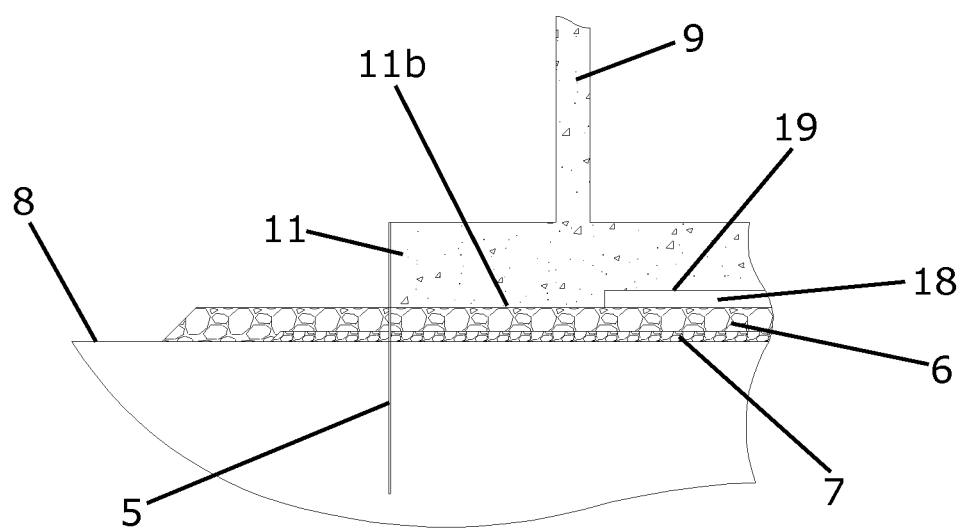
FIG. 10 is a sectional view of a further preferred embodiment of only the foundation part of the gravity based structure in FIG. 3.

FIG. 10 is a sectional view of a further preferred embodiment of the foundation 4 shown in FIG. 3 with skirts 5 penetrated through two layers of stones 6, 7 and into the natural seabed 8 below. The foundation 4 is equipped with landing plates 19 generating a gap 18 between the base plate 11 and the uppermost layer of stones 6 when the bottom surface 11b of the foundation 4 is resting on the landing plates 19.

Having described the basic constructional aspects of the gravity based structure with reference to the figures, all the above figures are again referred to while explaining the functioning of the structure of the present invention. Further, while explaining the functioning, the elaborate constructional aspects are not described, as this has already been done before.

It should be clear from the description hereinbefore that the present invention primarily solves the problems of pore pressure build-up and pumping effect acting on the foundation and allows a for substantial amount of water pockets under the base plate without experiencing the conventional loss in load bearing capacity associated with such water pockets.

More precisely, the capacity of certain types of seabed, particularly sands, silts and clays to carry loads is frequently weakened by increased pore water pressure as a result of cyclic loads like waves, currents and wind. Excess pore pressure generates a water cushion effect beneath the foundation causing a threat to its stability and reduces the load bearing capacity of the foundation.

Similarly, pockets of water left under the foundation worsen the effect of pore pressure build up as they generate a "pumping" effect. This happens, when the foundation is subjected to cyclic loads. Due to the cyclic loads, water is pumped into the sediments of the seabed adding to the pore pressure.

The gravity based structure according to the present invention, mainly solves the above two problems without suffering from any of the drawbacks, as discussed under the heading "background of the invention". How this is achieved will be particularly clear from the description hereinafter.

Referring to FIG. 1 and also to FIG. 2 in particular it shows the foundation 4 is placed on a single layer of rocks 7 with a gradation suitable to obtain effective drainage and at the same time avoid seabed 8 sediments migrating into the pores between the rocks. Naturally, this ensures that the drainage path through this layer 7 from the seabed 8 to the surrounding sea water 13 is substantially kept clear from sediments that potentially could block the drainage. Hence, pore pressure build up on the seabed 8 is substantially reduced and so is the impact of the pumping effect of water pockets 17 (best shown in FIG. 9) beneath the base portion 11 of the foundation.

Referring to FIG. 3, it shows the foundation 4 with skirts 5, installed onto the two rock layers 6, 7. The Skirts are narrow enough to be able to penetrate the two layers 6, 7 and extend into the natural soil of the seabed, so that the bottom of the foundation 4 rests directly upon the upper rock layer 6. The gradations of the multiple layers (two in this embodiment) have been selected such that the fine layer 7 stops seabed sediments from the natural seabed 8 from penetrating into the pores between the stones in the coarse layer 6. This has a double purpose: firstly it keeps the pores between the rocks in layer 6 open and thus prevents its drainage capacity from being reduced, and secondly it prevents differential settlements that can lead to a gradual loss of load bearing capacity, unwanted loads on the base plate 11 and to a tilt of the foundation 4.

In accordance with a preferred embodiment of the present invention, as specifically shown in FIGS. 4a and 4b, where the seabed 8 and the disposition of the layers 6, 7 only are illustrated, two layers of rock 6, 7 are placed on the natural seabed 8 prior to installation of the foundation 4. The lower layer 7 consists of finer material (smaller stones) and the upper layer 6 consists of coarser material (larger stones). The top rock layer 6 acts as drainage within the foundation skirt 5 and also as scour protection filter layer on the outside of the foundation 4.

Both layers consist of rocks with probability distributions for size, which commonly is called gradations. Depending upon the composition of the seabed, the rock gradations in this embodiment can be 10-30 mm, which means that rock sizes are ranging from 10 mm to 30 mm, with a mean size of 20 mm for the fine layer 7, and 25-70 mm, which means that rock sizes are ranging from 25 mm to 75 mm, with a mean size of 50 mm for the coarse layer. While this may be preferred rock gradations in this embodiment, alternative gradations may also be used, depending on the grain size and nature of the seabed soil, as well as the scouring potential at the site, which in turn depends among other things on currents, waves and water depth, and this is within the scope of the present invention.

The combined thickness of the two layers in this embodiment may be 0.5 m. The fine layer 7 may be laid over a diameter somewhat larger than the skirt 5 of the foundation 4, to ensure that the layer covers the entire footprint of the foundation 4 despite possible inaccuracy in its positioning.

The coarse layer 6 will in this embodiment, after installation of the foundation 4, also act as scour protection filter layer, and therefore has a sufficiently large diameter to fulfil this purpose (e.g. 10 meters radially out from the vertical wall 9). The diameter is however highly depending on the size of the foundation and the conditions at the site.

Referring to FIGS. 5 and 6, both show a section through one side of the foundation 4 in more detail. They show the base plate 11, its top surface 11a and bottom surface 11b resting on the coarser layer 6 and also the foundation wall 9, all typically made of reinforced concrete. The skirts 5 are typically made of steel, e.g., corrugated steel or sheet piles, but may also be made of concrete. The skirt tip may be sharpened to reduce the force needed to penetrate the skirt 5 through the stone layers 6, 7 (tip detail is not shown).

The figures also show the drainage openings 10 in the base plate 11 providing a part of the flow paths 10 to vent out surplus pore pressure. The pores within the gravel layers 6, 7 also form a part of the flow path.

FIG. 6 in particular shows flow paths by arrow markings for the water from the natural seabed 8 to the ambient body of water 13 (best understood when construed with reference to FIG. 3). It should be noted that the flow path distance through the natural seabed 8 is relatively short for all flow paths.

This means that the entire top surface of the natural seabed 8 inside the skirt 5 is efficiently drained since the water will flow easily through stone layers 6, 7 and the drainage openings 10. The drainage openings 10 may be equipped with filters (not shown) to prevent sand from entering into the openings 10 from the ambient body of water 13 (best shown in FIG. 3).

The drainage system provides drainage with capacity and locations determined to prevent a "pumping" effect to occur between water pockets 17 (best shown in FIG. 9) created under the base plate 11 due to the topography/texture of the upper layer 6. Furthermore, the drainage system, combined with the rock layers, provides drainage to the natural seabed 8, thus reducing pore pressure build-up.

The skirts 5 are penetrated through the two rock layers 6, 7 by the weight of the foundation 4. Further penetration into the natural seabed 8 is also obtained by the weight of the foundation 4 possibly helped by one or both of the following methods:

Creating a lower pressure under the foundation by pumping water out of the volume confined by the skirts 5, base plate 11 and the upper rock layer 6. This method is similar to the installation of suction anchors, and requires temporary closure of drainage openings 10.

Adding weight to the foundation 4, for instance by placing ballast into its interior.

Referring to the embodiment in FIGS. 7a and 7b, which show only the seabed 8 and the rock layers for convenience of understanding, a layer of rocks 12 is placed in an annular configuration in combination with one or more layers of rocks 6, 7. The third layer 12, which is a ring layer, provides a central space 4a at the middle of the layers 6, 7, allowing room for the foundation 4 to be installed. The third layer 12 can have a gradation suitable to act as a scour protection armour layer, i.e. at least as coarse as the second layer 6.

After the installation of the foundation 4, any gap between the armour layer 12 and the foundation 4 can be filled with suitable materials or objects, for instance sand bags, filter units or large rocks. Like the other embodiments, this embodiment too enables all substantial rock layers to be installed at the same time, reducing the costs for mobilization and demobilization of rock installation vessels.

In a further embodiment (not shown in detail), the bottom surface of the base plate 11 has a non-flat geometry or texture. For instance, the base plate may have been cast with a rock layer similar to the upper layer 6 installed into the formwork, so that the underside of the foundation comprises rocks partially embedded into the concrete of the foundation. This will increase the friction between the foundation and the upper rock layer 6.

In another embodiment, referring to FIG. 8, rocks are placed in bags 14 arranged under the foundation base plate 11. In this embodiment the foundation 4 may possibly be set directly down on a natural seabed 8 without prior installation of any rock layers on the seabed.

In an alternative embodiment, the rocks in bags 14 or alternatively rock layer 7 is replaced by other suitable granular material such as light expanded clay aggregate. The latter consists of air filled grains and would not be possible to install without attaching it to the foundation. The bags 14 may be of a type that dissolves in water after some time.

Referring to FIG. 9, it is another embodiment of the foundation part 4 shown in FIG. 3. In this embodiment grout is injected through a grout distribution system 16. The grout distribution system comprises a system of horizontal and vertical pipes 16. Water pockets 17 exist below the bottom portion 11b of the base plate 11. Grouting mixture (not shown) is pumped through the pipes 16, to expel water out of water pockets 17. This ensures better support surface between the foundation base plate 11 and the uppermost rock layer 7.

This figure, particularly the enlarged portion, also shows that it is possible to pre-install a geo-textile membrane 15 beneath the bottom portion 11b of the base plate 11. This allows water to escape, but grout to be retained (geo textile) and can be used to avoid grout filling the pores between the rock layer 6.

Referring to FIG. 10, landing plates 19 are provided under the base plate 11 to create a gap 18 between the topmost rock layer 6 and the bottom portion 11b of the base plate 11. In this embodiment, grout may be injected into the gap 18 generated, when the foundation 4 is set down on the landing plates 19.

The landing plates 19 may be individually equipped with basically circumferential skirts to increase their load bearing capacity (not shown) and may be fabricated to counteract a seabed slope so the foundation is vertical even if the topmost rock layer 6 is sloping.

In one further embodiment, the skirts enclose multiple, distinct compartments under the base plate. Such compartments can be located inside or outside the substantially circular main circumferential skirt or a combination of inside and outside the substantially circular main circumferential skirt (not shown).

Hence, from the description hereinbefore it would be clear that all the objects of the invention are achieved and simultaneously the drawbacks of prior art are overcome.

Furthermore, it should be understood from the description that a structure with skirts can be installed without injection of a grouting material. Additionally, the gravity-based structure with skirts in accordance with the present invention can be installed after the installation of its scour protection filter layer, so that the foundation is not left un-protected with respect to erosion, after its installation. In fact the foundation can be installed after the installation of both its filter and most of its armour layer, so that the vessel that installs the scour protection system can do so in one go, while affording the instant protection to the foundation mentioned in the previous paragraph.

The invention utilizes the natural pore volume between the rock layer stones as an effective flow path to vent away pore pressure and hence provides drainage very effectively to the top surface of the soil beneath the foundation. The effective drainage over large areas provides significant strengthening of the soil which is a significant improvement over the present state of the art technology. Further, water pockets at the interface between the rock layer and the base plate do not give a pumping effect since the water is vented out of the rock layer through the vent openings. As a result the water is not pumped into the soil beneath and a significant amount of water pockets becomes allowable. This is a further significant improvement over the present state of the art technology as the rock layer does not need to be placed within very strict installation tolerances.

The present invention has been described with reference to some preferred embodiments and some drawings for the sake of understanding only and it should be clear to persons skilled in the art that the present invention includes all legitimate modifications within the ambit of what has been described hereinbefore and claimed in the appended claims.

The invention claimed is:

1. A gravity based structure for supporting offshore installations, the gravity based structure comprising:
   a foundation comprising:
      a basal portion comprising:
         a wall extending upwardly from the basal portion, said wall forming an outer boundary of a cavity;
         a slab defining a lower boundary of said cavity, said slab having a top surface and a bottom surface and including a portion extending outside a bottom edge of the wall;
         a plurality of channels, each channel of the plurality of channels formed through said portion of the slab extending outside the bottom edge of the wall and each channel of the plurality of channels extending from the bottom surface of the slab to the top surface of the slab, each channel of the plurality of channels comprising a first opening formed through the bottom surface of the slab and open to water surrounding the slab and a second opening formed through the top surface of the slab and open to water surrounding the slab, said plurality of channels acting as drainage channels to reduce pore pressure build-up under said slab, the top surface of the portion of the slab extending outside the bottom edge of the wall being in direct contact with water surrounding an exterior of the gravity based structure; and
      wherein at least one first layer of filter material, with a gradation suitable for draining water entrapped beneath the basal portion, is installed on a seabed beneath the foundation.

2. The gravity based structure according to claim 1, wherein the at least one first layer of filter material includes only one layer of filter material between the basal portion and a natural level of the seabed, the at least one first layer of filter material having a gradation suitable both for effective drainage of water from the seabed and substantially preventing seabed sediments from entering into pores within layers of the at least one first layer of filter material.

3. The gravity based structure according to claim 1, wherein:
   the at least one first layer of filter material is a rock layer; and
   a second rock filter layer of suitable gradation is provided on top of the at least one first layer of filter material prior to installation of the foundation;
   the second rock filter layer is of a coarser gradation than the at least one first layer of filter material;
   the at least one first layer of filter material has a gradation that substantially prevents seabed sediments from entering pores between grains of the at least on first layer filter material; and
   the second rock filter layer extends beyond a perimeter of the at least one first layer of filter material and also beyond a perimeter of the basal portion.

4. The gravity based structure according to claim 3, wherein:
   an additional scour protective layer with a coarser gradation than the at least one first layer of filter material provided in an annular configuration on top of the at least one first layer of filter material or the second rock filter layer prior to installation of the foundation to act as an armour layer; and
   an opening disposed in a middle of the additional scour protective layer.

5. The gravity based structure according to claim 4, wherein after installation of the foundation, a gap between the foundation and the additional scour protective layer is filled with additional scour protection material.

6. The gravity based structure according to claim 5, wherein the additional scour protective layer comprises at least one of:
   filter units comprising mesh bags filled with rocks; and
   sand bags.

7. The gravity based structure according to claim 4, further comprising a second additional scour protection material disposed in the opening defined in the middle of the additional scour protective layer.

8. The gravity based structure according to claim 3, wherein the at least one first layer of filter material has a gradation of 10-30 mm and the second rock filter layer has a gradation of 25-70 mm.

9. The gravity based structure according to claim 1, wherein each channel of the plurality of channels is provided with a filter for preventing unwanted clogging by sediments.

10. The gravity based structure according to claim 1, wherein a bottom surface of the basal portion of the foundation is provided with bags having filter material therein, for installation on the seabed together with the foundation.

11. The gravity based structure according to claim 10, wherein the bags are filled with light expanded clay aggregate.

12. The gravity based structure according to claim 1, wherein a geo-textile membrane is attached to the foundation beneath a bottom side of the basal portion.

13. The gravity based structure according to claim 1, wherein a piping system is located inside the basal portion for pumping grout to expel water pockets beneath the basal portion.

14. The gravity based structure according to claim 1, wherein landing plates are provided at a bottom surface of the basal portion to create a gap between a top scour protecting layer and the basal portion.

15. The gravity based structure according to claim 14, wherein each of the landing plates are each equipped with a circumferential skirt.

16. The gravity based structure according to claim 1, wherein a bottom surface of the basal portion of the foundation has an uneven geometry or texture to increase friction against an underlying rock layer.

17. The gravity based structure according to claim 16, wherein an uneven bottom surface is created by rocks partially embedded into concrete of the foundation.

18. The gravity based structure according to claim 1, wherein, after installation of the gravity based structure, the plurality of channels connect the at least one filter layer of filter material with the water surrounding the portion of the slab extending outside the bottom edge of the wall.

19. The gravity based structure according to claim 1, wherein the foundation comprises a downwardly extending skirt adapted to penetrate into the seabed beneath the at least one first layer of filter material.

20. The gravity based structure according to claim 19, wherein openings are provided in the downwardly extending skirt.

* * * * *